United States Patent
Stephens

(10) Patent No.: US 7,839,845 B2
(45) Date of Patent: Nov. 23, 2010

(54) APPARATUS, SYSTEM AND METHOD CAPABLE OF AGGREGATE COMPRESSION IN A WIRELESS LAN

(75) Inventor: Adrian P. Stephens, Cottenham (GB)

(73) Assignee: Intel Corporation, Santa Clara, CA (US)

(*) Notice: Subject to any disclaimer, the term of this patent is extended or adjusted under 35 U.S.C. 154(b) by 763 days.

(21) Appl. No.: 11/167,994

(22) Filed: Jun. 27, 2005

(65) Prior Publication Data

US 2006/0291461 A1    Dec. 28, 2006

(51) Int. Cl.
    *H04L 12/28* (2006.01)
(52) U.S. Cl. .......... 370/389; 370/392; 370/393; 370/473; 370/474
(58) Field of Classification Search .......... 370/389, 370/390, 474, 462, 469, 472, 473, 535, 204, 370/230, 252, 254, 329, 338, 392, 393, 394, 370/465, 470, 471, 486, 476, 475; 455/517, 455/518, 519, 522, 524, 701, 746, 776, 752, 455/749, 748; 714/701, 746, 776, 752, 749, 714/748; 709/223; 725/81
See application file for complete search history.

(56) References Cited

U.S. PATENT DOCUMENTS

| | | | |
|---|---|---|---|
| 6,192,259 B1* | 2/2001 | Hayashi | 455/575.1 |
| 7,209,491 B2* | 4/2007 | Zheng et al. | 370/477 |
| 7,266,087 B2* | 9/2007 | Wahl | 370/252 |
| 7,346,026 B2* | 3/2008 | Sherman et al. | 370/328 |
| 7,474,676 B2* | 1/2009 | Tao et al. | 370/469 |
| 2003/0169769 A1* | 9/2003 | Ho et al. | 370/473 |
| 2003/0235197 A1* | 12/2003 | Wentink | 370/393 |
| 2004/0083388 A1* | 4/2004 | Nguyen | 713/201 |
| 2004/0233878 A1* | 11/2004 | Liu et al. | 370/338 |
| 2005/0114489 A1* | 5/2005 | Yonge et al. | 709/223 |
| 2005/0152359 A1* | 7/2005 | Giesberts et al. | 370/389 |
| 2006/0013256 A1* | 1/2006 | Lee et al. | 370/473 |
| 2006/0029099 A1* | 2/2006 | Jang et al. | 370/473 |
| 2006/0034274 A1* | 2/2006 | Kakani et al. | 370/389 |
| 2006/0056443 A1* | 3/2006 | Tao et al. | 370/462 |
| 2006/0095615 A1* | 5/2006 | Kim et al. | 710/62 |
| 2006/0227733 A1* | 10/2006 | Frederiks et al. | 370/310 |
| 2006/0236300 A1* | 10/2006 | Lajolo et al. | 717/100 |
| 2006/0252443 A1* | 11/2006 | Sammour et al. | 455/518 |
| 2007/0005675 A1* | 1/2007 | Ginzburg et al. | 708/523 |
| 2007/0053354 A1* | 3/2007 | Rudolf et al. | 370/389 |
| 2007/0104162 A1* | 5/2007 | Kneckt et al. | 370/338 |
| 2007/0237120 A1* | 10/2007 | Xu | 370/338 |
| 2007/0255947 A1* | 11/2007 | Choudhury et al. | 713/161 |
| 2008/0043731 A1* | 2/2008 | Lim et al. | 370/389 |

OTHER PUBLICATIONS

IEEE Standard 802.11, 1999 Edition Part 11: Wireless LAN Medium Access Control (MAC) and Physical Layer (PHY) Specifications, pp. 43-45.*

* cited by examiner

*Primary Examiner*—Aung S Moe
*Assistant Examiner*—Abdullah Riyami
(74) *Attorney, Agent, or Firm*—Cool Patent, P.C.; Joseph P. Curtin

(57) ABSTRACT

An embodiment of the present invention provides an apparatus, comprising a transmitter capable of compressing header information in an aggregate of Media Access Control Service Data Units (MSDUs) by using one or more flags fields to describe which address fields are present in said aggregate.

21 Claims, 2 Drawing Sheets

APPARATUS, SYSTEM AND METHOD CAPABLE OF AGGREGATE COMPRESSION IN A WIRELESS LAN

BACKGROUND

Wireless networks and wireless communication have become prevalent throughout society creating the need for increased capacity and faster and more reliable wireless communication techniques. TGn Sync is a multi-industry group working together to rapidly introduce a unified proposal for the next generation of high performance wireless networks.

A proposal to 802.11 TGn may dramatically improve the capabilities of wireless networks while supporting the antenna configurations, product designs and protocol requirements of hundreds of millions of cellular handsets, enterprise base stations, and Wi-Fi enabled computers already in use. Key Features of the TGn Sync Proposal may include: MIMO Spatial Division Multiplexing to support 315 Mbps reliably with two antennas, up to 630 Mbps with larger systems; Scalable Architecture for different spatial stream (2 to 4) and spectrum configurations (10, 20, 40 MHz); seamless interoperability between 802.11a/b/g and new modes of operation; timed receive mode switching and multiple receiver addressing to reduce power for battery-operated devices; and flexible architecture offering product compliance for all major regulatory domains while preserving interoperability.

In the TGnSync proposal, there is included a Media Access Control Service Data Units (A-MSDU) aggregation, which is a way of "batching together" multiple higher-layer packets (MSDUs) into a single transmission unit, such as Media Access Control Protocol Data Units (MPDU). However, the subframe header in this proposal may be a fixed length and may contain information that is redundant if the A-MSDU contains multiple MSDUs for the same destination address/ source address (DAISA) pair.

Thus, a strong need exists for the ability to remove the redundant information by providing an apparatus, system and method capable of aggregate compression in a wireless local area network (WLAN).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
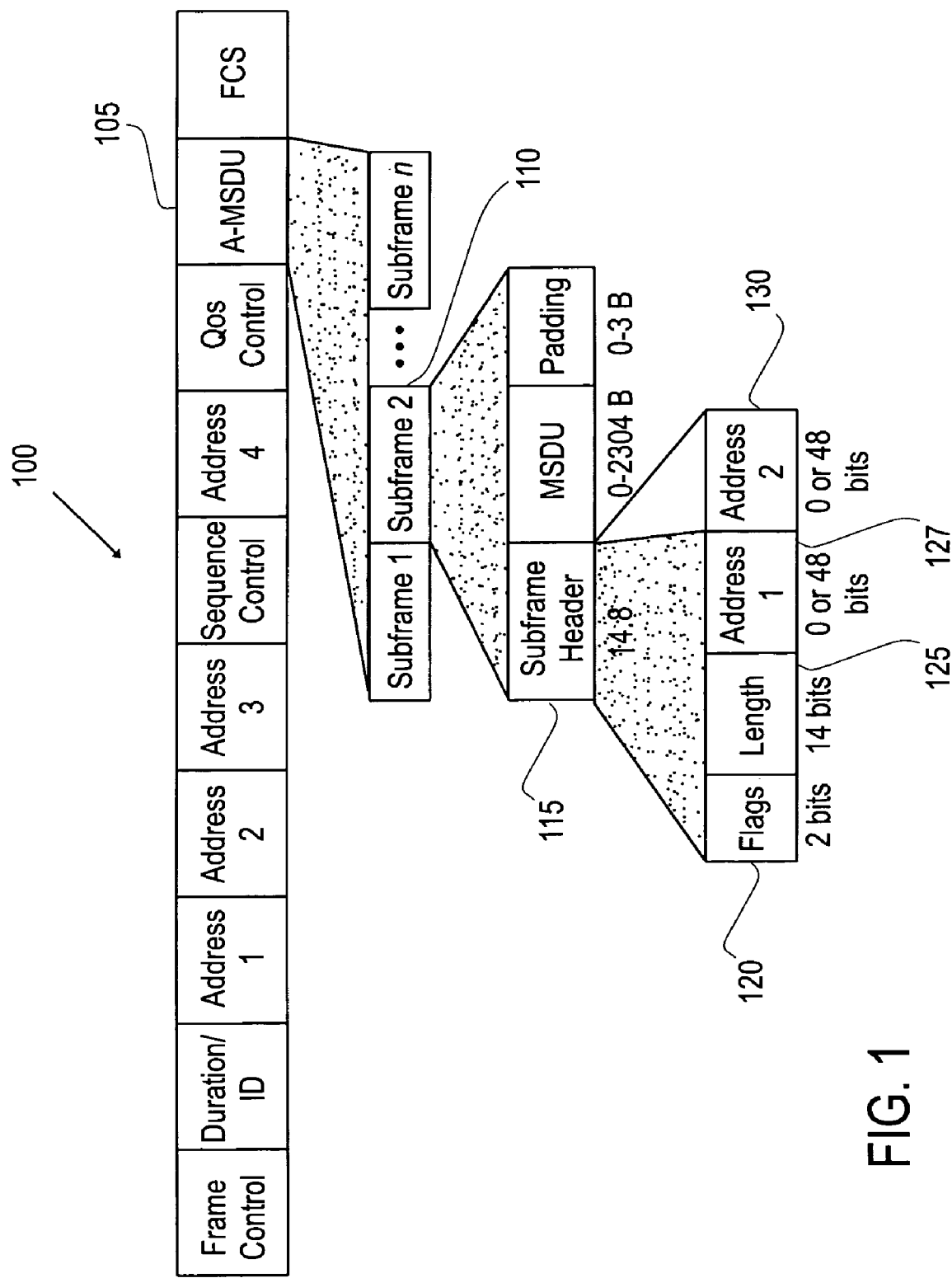
FIG. 1 illustrates a structure of a subframe header with A-MSDU aggregation of an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause and effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like).

Turning now to FIG. 1, as shown generally at 100, is an A-MSDU 105 aggregation, which is a way of "batching together" multiple higher layer packets (MSDUs) into a single transmission unit (MPDU). It batches multiple MSDUs as though there were a single MSDU from the higher layer. The resulting A-MSDU is transported in one (unfragmented) or more (fragmented) Data MPDUs. In order to compress the header information, the subframe header 115 may be replaced by a new structure that is variable in length. Two unnecessary bits from the length field 125 may be used to created a flags 120 field that defines the layout of the new structure. The two bits are unnecessary since the MSDU may be limited in length (2304 B) so that 12 bits suffices to indicate the length. Further, there are actually 4 spare bits, and the present invention may use only 2 of them and leave 2 in an over-generous length field. The transmitter may use this feature to remove unnecessary address fields from the aggregate. As shown in FIG. 1, address 1 (127) may be 0 or 48 bits and address 2 (130) may also be 0 or 48 bits in one exemplary embodiment of the present invention. However, it is understood that the present invention is not limited in this respect. The following table is one illustration of the Flags and address presence or not of one embodiment of the present invention.

| Flags | Address 1 | Address 2 |
|---|---|---|
| 00 | Not present | Not present |
| 01 | DA | Not present |
| 10 | SA | Not present |
| 11 | DA | SA |

Further, one embodiment of the present invention as an option may provide for an optimum compression with the optimal compression technique requiring the transmitter to have Temp_DA (temporary destination address) and Temp_SA (temporary source address) variables that may contain a short range (wireless technique address, such as an Institute of Electrical and Electronic Engineers (IEEE) 802.11 MAC address.

The transceiver or transmitter may initialize these variables from the Address fields of the MPDU header according to the state of the TODS and FromDS bits in the MPDU header as shown below (although it is understood that this table is merely illustrative of one embodiment of the present invention).

| To DS | From DS | Temp_DA | Temp_SA |
|---|---|---|---|
| 0 | 0 | Address 1 | Address 2 |
| 0 | 1 | Address 1 | Unspecified |
| 1 | 0 | Unspecified | Address 2 |

-continued

| To DS | From DS | Temp_DA | Temp_SA |
|---|---|---|---|
| 1 | 1 | Unspecified | Unspecified |

Following this initialization, the temporary destination address (Temp_DA) and temporary source address (Temp_SA) variables either contain an address, or contain the value unspecified. An unspecified value will not match any address in the algorithm or process described below. Then, for each Media Access Control Service Data Units (MSDU) with requested destination address called Media Access Control Service Data Units Destination Address (MSDU_DA) and source address called Media Access Control Service Data Units Source Address (MSDU_SA) that the transmitter wishes to add, it may perform the following logic

```
if MSDU_DA matches Temp_DA and MSDU_SA
matches Temp_SA
    Use format with neither address present
else if MSDU_DA matches Temp_DA
    Use format with only SA present
    Update Temp_SA variable from MSDU_SA
else if MSDU_SA matches Temp_SA
    Use format with only DA present
    Update Temp_DA variable from MSDU_DA
else
    Use format with both SA and DA present
    Update Temp_SA and Temp_DA variables
    from MSDU_SA and
MSDU_DA
end
```

An embodiment of the present invention provides Receiver support for this feature. The receiver may keep the temporary destination address (Temp_DA) and temporary source address (Temp_SA) variables that are initialized from the Media Access Control Protocol Data Units (MPDU) header as defined by the same table above. It then may perform the following steps for each MSDU in the aggregate in order to determine MSDU_DA and MSDU_SA which are the addresses it indicates to the higher layers with the MSDU.

In an embodiment of the present invention, the algorithm may be described as follows:

```
if format has both DA and SA present
    Temp_DA = DA from subframe header
    Temp_SA = SA from subframe header
else if format has DA present
    Temp_DA = DA from subframe header
else if format has SA present
    Temp_SA = SA from subframe header
end
```

Indicate MSDU to higher layers using Temp_SA as the source address and Temp_DA as the destination address And:

```
if format has DA present
    Temp_DA = DA from subframe header
end
```

Indicate MSDU to higher layers using Temp_SA as the source address and Temp_DA as the destination address.

Figure 2:
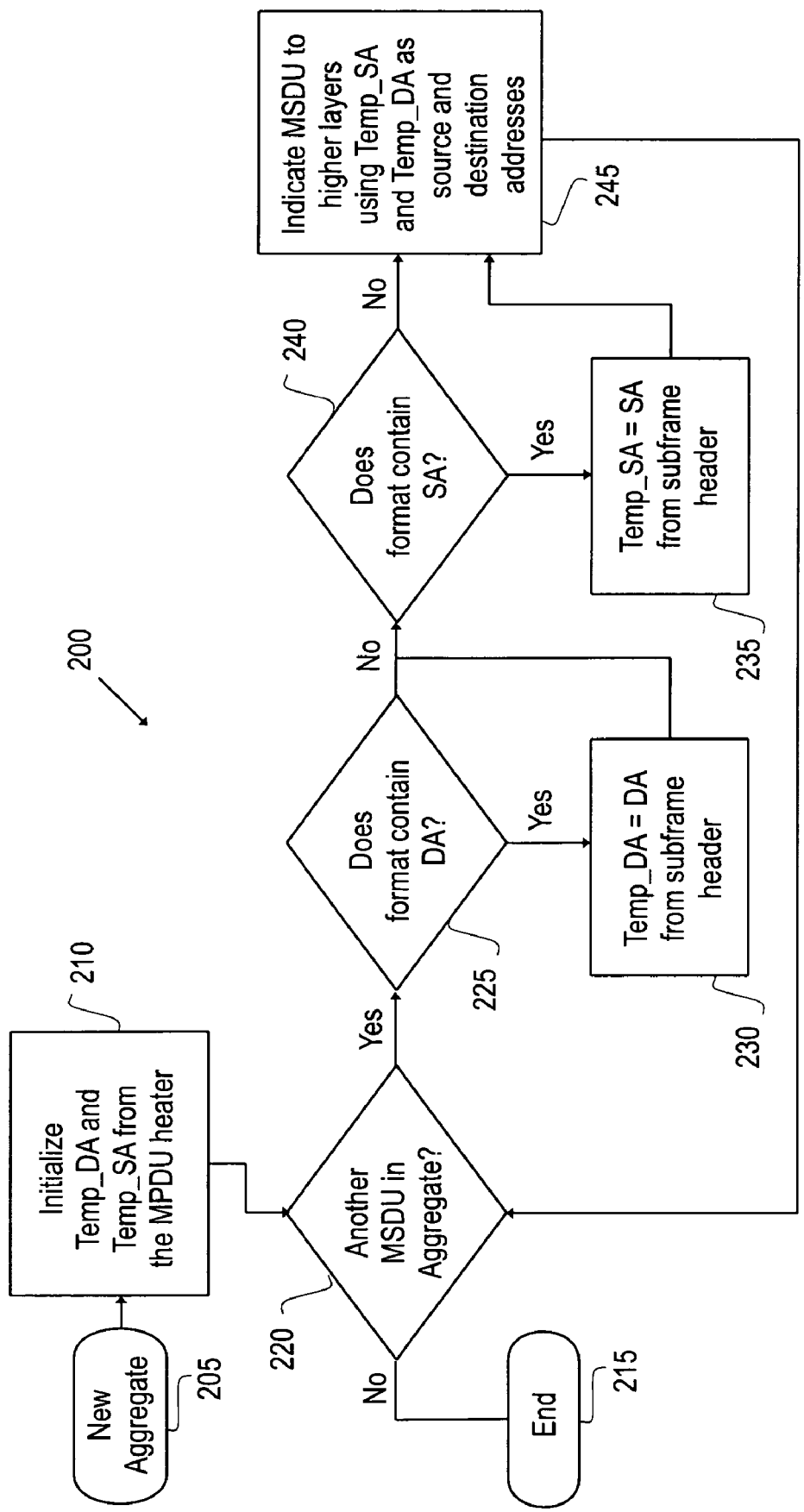
FIG. 2 is a flow chart illustrating the process used of aggregate compression of one embodiment of the present invention.

Turning now to FIG. 2, shown generally as 200, is a flowchart of the operation of the algorithm of one embodiment of the present invention. New Aggregate 205 is initialized as Temp_DA and Temp_SA from the MPDU header at 210. At 220, it is determined if another MSDU in Aggregate. If no, the process ends at 215, and if Yes, at 225, it is determined if the format contains a Destination Address (DA). If no at 225, it is determined at 240 if the format contains SA immediately, but if yes, Temp_DA is set to DA from subframe header first at 230 and then determined if the format contains SA at 240. If no at 240, indicate MSDU to higher layers using Temp_SA and Temp_DA as source and destination addresses at 255. If yes at 240, Temp_SA is set to SA from subframe header at 235 and then indicates MSDU to higher layers using Temp_SA and Temp_DA as source and destination addresses at 245. After 245, the process returns to 220 to determine if there is another MSDU in Aggregate. Thus, by adding subframe header compression, it is possible to save 12B per MSDU.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is

1. An apparatus, comprising:
a transmitter adapted to compress subframe header information in a MAC Protocol Data Unit (MPDU), the MPDU comprising an aggregate of Media Access Control Service Data Units (MSDUs) by using one or more flags fields in an MSDU to describe which address fields are present or not present, or a combination thereof, in the MSDU and further adapted to provide for an optimum compression by requiring said transmitter to have temporary destination address and temporary source address variables that may contain a short range, the temporary destination address variable or the temporary source address variable being based on an address field in a header of the MPDU; and
wherein each MSDU of the MPDU comprises a variable length subframe header.

2. The apparatus of claim 1, wherein each MSDU present in said aggregate is accompanied by a subframe header containing said flags field.

3. The apparatus of claim 2, wherein said subframe header contains a destination MAC address, which is present only when indicated in said flags field.

4. The apparatus of claim 2, wherein said subframe header contains a source MAC address, which is present only when indicated in said flags field.

5. The apparatus of claim 1, further comprising specifying only Destination Address (DA) values when the value changes.

6. The apparatus of claim 1, further comprising specifying only Source Address values when the value changes.

7. The apparatus of claim 1, further comprising using the MPDU header to define initial values for Destination Address and Source Address if present.

8. The apparatus of claim 1, wherein unnecessary address fields from the aggregate are removed.

9. A method of compressing subframe header information in a MAC Protocol Data Unit (MPDU), the MPDU comprising an aggregate of Media Access Control Service Data Units (MSDUs), the method comprising:
using a flags field to describe whether a Destination Address (DA) field of an MSDU is present or not present, or a combination thereof, and specifying only DA values when the value changes and providing for an optimum compression by requiring a transmitter using the flags field to have temporary destination address and temporary source address variables that may contain a short range, the temporary destination address variable or the temporary source address variable being based on an address field in a header of the MPDU; and
wherein each MSDU of the MPDU comprises a variable length subframe header.

10. The method of claim 9, further comprising using the MPDU header to define initial values for Destination Address and Source Address if present.

11. The method of claim 10, further comprising removing unnecessary address fields from the aggregate.

12. The method of claim 11, further comprising requiring Temp_DA and Temp_SA variables that can contain a MAC address.

13. An apparatus, comprising:
a receiver adapted to decompress subframe header information in a MAC Protocol Data Unit (MPDU), the MPDU comprising an aggregate of Media Access Control Service Data Units (MSDUs) compressed by using one or more flags fields in an MSDU to describe which address fields are present or not present, or a combination thereof, in said MSDU in order to determine an MSDU Destination Address and an MSDU Source Address, which are the addresses indicated to higher layers with the MSDU and further adapted to decompress compressed header information using optimum compression that requires a transmitter to have temporary destination address and temporary source address variables that may contain a short range, the temporary destination address variable or the temporary source address variable being based on an address field in a header of the MPDU; and
wherein each MSDU of the MPDU comprises a variable length subframe header.

14. The apparatus of claim 13, wherein each MSDU present in said aggregate is accompanied by a subframe header containing said flags field.

15. The apparatus of claim 14, wherein said subframe header contains a destination MAC address, which is present only when indicated in said flags field.

16. The apparatus of claim 14, wherein said subframe header contains a source MAC address, which is present only when indicated in said flags field.

17. The apparatus of claim 16, wherein said apparatus is capable of decompressing header information in an aggregate of Media Access Control Service Data Units (MSDUs) that was further compressed by specifying only Destination Address (DA) values when the value changes.

18. The apparatus of claim 17, wherein said apparatus is capable of decompressing header information in an aggregate of Media Access Control Service Data Units (MSDUs) that was further compressed by specifying only Source Address values when the value changes.

19. The apparatus of claim 18, wherein said apparatus is capable of decompressing header information that was compressed using a compression technique that requires said apparatus to have Temp_DA and Temp_SA variables that can contain a MAC address.

20. An apparatus comprising: a non-transitory computer-readable medium having stored thereon instructions that, if executed, result in at least the following:

compressing subframe header information in a MAC Protocol Data Unit (MPDU), the MPDU comprising an aggregate of Media Access Control Service Data Units (MSDUs) by using a field to describe which address fields are present or not present, or a combination thereof, in an MSDU in said aggregate and specifying only Destination Address (DA) values when the value changes and providing for an optimum compression by requiring a transmitter to have temporary destination address and temporary source address variables that may contain a short range, the temporary destination address variable or the temporary source address variable being based on an address field in a header of the MPDU; and wherein each MSDU of the MPDU comprises a variable length subframe header.

21. The apparatus of claim 20, further comprising using the MPDU header to define initial values for Destination Address and Source Address if present.

* * * * *